US009446345B2

United States Patent
Naito

(10) Patent No.: US 9,446,345 B2
(45) Date of Patent: Sep. 20, 2016

(54) DESULFURIZATION DEVICE

(71) Applicant: IHI Corporation, Koto-ku (JP)

(72) Inventor: Toshiyuki Naito, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/858,611

(22) Filed: Sep. 18, 2015

(65) Prior Publication Data

US 2016/0051924 A1 Feb. 25, 2016

Related U.S. Application Data

(63) Continuation of application No. PCT/JP2014/064869, filed on Jun. 4, 2014.

(30) Foreign Application Priority Data

Jun. 6, 2013 (JP) .................. 2013-119469

(51) Int. Cl.
  *B01D 53/14* (2006.01)
  *F23J 15/00* (2006.01)
  *F23J 15/04* (2006.01)
  *B01D 53/50* (2006.01)
  *B01D 53/18* (2006.01)

(52) U.S. Cl.
  CPC ......... *B01D 53/1481* (2013.01); *B01D 53/185* (2013.01); *B01D 53/504* (2013.01); *F23J 15/003* (2013.01); *F23J 15/04* (2013.01); *B01D 2251/404* (2013.01); *B01D 2251/606* (2013.01); *B01D 2258/0283* (2013.01); *F23J 2215/20* (2013.01); *F23J 2217/20* (2013.01); *F23J 2219/40* (2013.01)

(58) Field of Classification Search
  None
  See application file for complete search history.

(56) References Cited

U.S. PATENT DOCUMENTS

| 5,648,048 | A | 7/1997 | Kuroda et al. |
| 2011/0232488 | A1 | 9/2011 | Zhuo |

FOREIGN PATENT DOCUMENTS

| JP | 09-299745 A | 11/1997 |
| JP | 10-118449 A | 5/1998 |
| JP | 2012-510888 A | 5/2012 |
| WO | WO 94/23826 A1 | 10/1994 |

OTHER PUBLICATIONS

International Search Report issued Aug. 26, 2014 for PCT/JP2014/064869 filed on Jun. 4, 2014 with English Translation.

*Primary Examiner* — Duane Smith
*Assistant Examiner* — Phillip Shao
(74) *Attorney, Agent, or Firm* — Oblon, McClelland, Maier & Neustadt, L.L.P.

(57) ABSTRACT

Provided are a downward-inclined-flow passage to which flows flue gas from the flue path connecting a boiler with a stack, a sprayer arranged upstream in the downward-inclined-flow passage to inject absorbing liquid absorptive of sulfur oxides in a direction same as that of flue gas flow, an upward-inclined-flow passage to guide flue gas from the downward-inclined-flow passage to the flue path, a reservoir arranged between lower ends of the flow passages, an auxiliary sprayer arranged in the downward-inclined-flow passage downstream of the sprayer to inject absorbing liquid for uniformization thereof in the downward-inclined-flow passage and a baffle plate arranged in the downward-inclined-flow passage downstream of the auxiliary sprayer and in an upper zone of the flow passage to throttle the flow-passage inner diameter.

5 Claims, 4 Drawing Sheets

DESULFURIZATION DEVICE

TECHNICAL FIELD

The present disclosure relates to a desulfurizer for desulfurization of sulfur oxides entrained in flue gas from a boiler in a heat power plant, using a wet desulfurizing agent.

BACKGROUND ART

The boiler in the heat power plant produces the flue gas entraining sulfur oxides due to combustion of fossil fuel. Among the sulfur oxides, specifically sulfur dioxide and sulfur trioxide are ones of primary causes in environmental concerns such as air pollution and acid rain. Thus, the heat power plant is provided with a desulfurizer to desulfurize sulfur oxides such as sulfur dioxide and sulfur trioxide in the flue gas.

Prevailing desulfurizers are wet ones using limestone-gypsum process; especially spray-type ones are employed frequency. In the spray-type desulfurizer, absorbing liquid containing a wet desulfurizing agent is sprayed to the flue gas in an absorbing column where sulfur oxides in the flue gas are desulfurized by the absorbing liquid. In the desulfurizer, the longer the time during which the sulfur oxides are in gas-liquid contact with the absorbing liquid (hereinafter referred to as reaction time) is, the more the desulfurization performance is enhanced. Thus, it may be conceived that the absorbing column is increased in height to elongate the reaction time. However, the desulfurizer with the absorbing column increased in height has a problem that construction cost is increased.

Then, a simplified desulfurizer has been proposed which can elongate a reaction time while suppressing height of an absorbing column. The simplified desulfurizer shown in undermentioned Patent Literature 1 comprises a V-shaped reactor vessel arranged below a flue path connecting a boiler with a stack to extract from the flue path part of flue gas flowing therethrough and return the same to the flue path, a nozzle arranged on an inlet side of the reactor vessel to spray absorbing liquid in a direction same as that of flue gas flow and a reservoir arranged at a bottom of the reactor vessel to capture the absorbing liquid, thereby attaining simplification in structure in comparison with conventional desulfurizers.

Undermentioned Patent Literature 2 discloses that, in a wet flue-gas desulfurizer with an exhaust gas flow passage for horizontally guiding exhaust gas, a plurality of sprayer nozzles are arranged along the exhaust gas flow passage to enhance desulfurization performance by differentiating pressures, injection angles, flow rates of the respective spray nozzles. Undermentioned Patent Literature 3 discloses that, in a wet flue-gas desulfurizer with an exhaust gas flow passage for horizontally guiding exhaust gas, a plurality of sprayer nozzles are arranged along and vertically of the exhaust gas flow passage to minimize ranges with no spray drops to thereby enhance desulfurization performance.

CITATION LIST

Patent Literature

[Patent Literature 1] JPH 10-118449A
[Patent Literature 2] JPH 09-299745A
[Patent Literature 3] WO 94/23826A

SUMMARY

Technical Problems

However, the simplified desulfurizer according to Patent Literature 1 has room for enhancing the desulfurization performance in that even if sprayed in the direction same as that of the flue gas flow, the absorbing liquid does not proceed along the flow passage but drops downward due to influence of gravitational force, so that the absorbing liquid does not become uniform in the reactor vessel. The desulfurizer disclosed in Patent Literature 2 or 3 is not that with an absorbing column increased in height to elongate a reaction time and thus enhance desulfurization performance.

The disclosure was made in view of the above to provide a desulfurizer which uniformizes absorbing liquid in an inclined flow passage to further enhance desulfurization performance.

Solution to Problems

A desulfurizer according to the disclosure comprises a descending downward-inclined flow passage through which flows flue gas from a flue path connecting a fuel combustor with a stack, a sprayer arranged upstream in the downward-inclined flow passage for injecting absorbing liquid absorptive of sulfur oxides in a direction same as that of flue gas flow, an ascending upward-inclined flow passage for guiding the flue gas from the downward-inclined flow passage to the flue path, a reservoir arranged between lower ends of the upward- and downward-inclined flow passages, an auxiliary sprayer arranged in the downward-inclined flow passage downstream of the sprayer for injecting absorbing liquid so as to uniformize the absorbing liquid in the downward-inclined flow passage and a baffle plate arranged in the downward-inclined flow passage downstream of the auxiliary sprayer and in an upper zone of the flow passage for throttling an inner diameter of the flow passage.

A mist eliminator for removal of mist of the absorbing liquid may be arranged downstream in the upward-inclined flow passage.

Preferably, the upward-inclined flow passage has a flow-passage cross sectional area greater than that of the downward-inclined flow passage.

Advantageous Effects

According to a desulfurizer of the disclosure, the absorbing liquid in an inclined flow passage is uniformized to further enhance desulfurization performance.

DESCRIPTION OF EMBODIMENT

Figure 1:
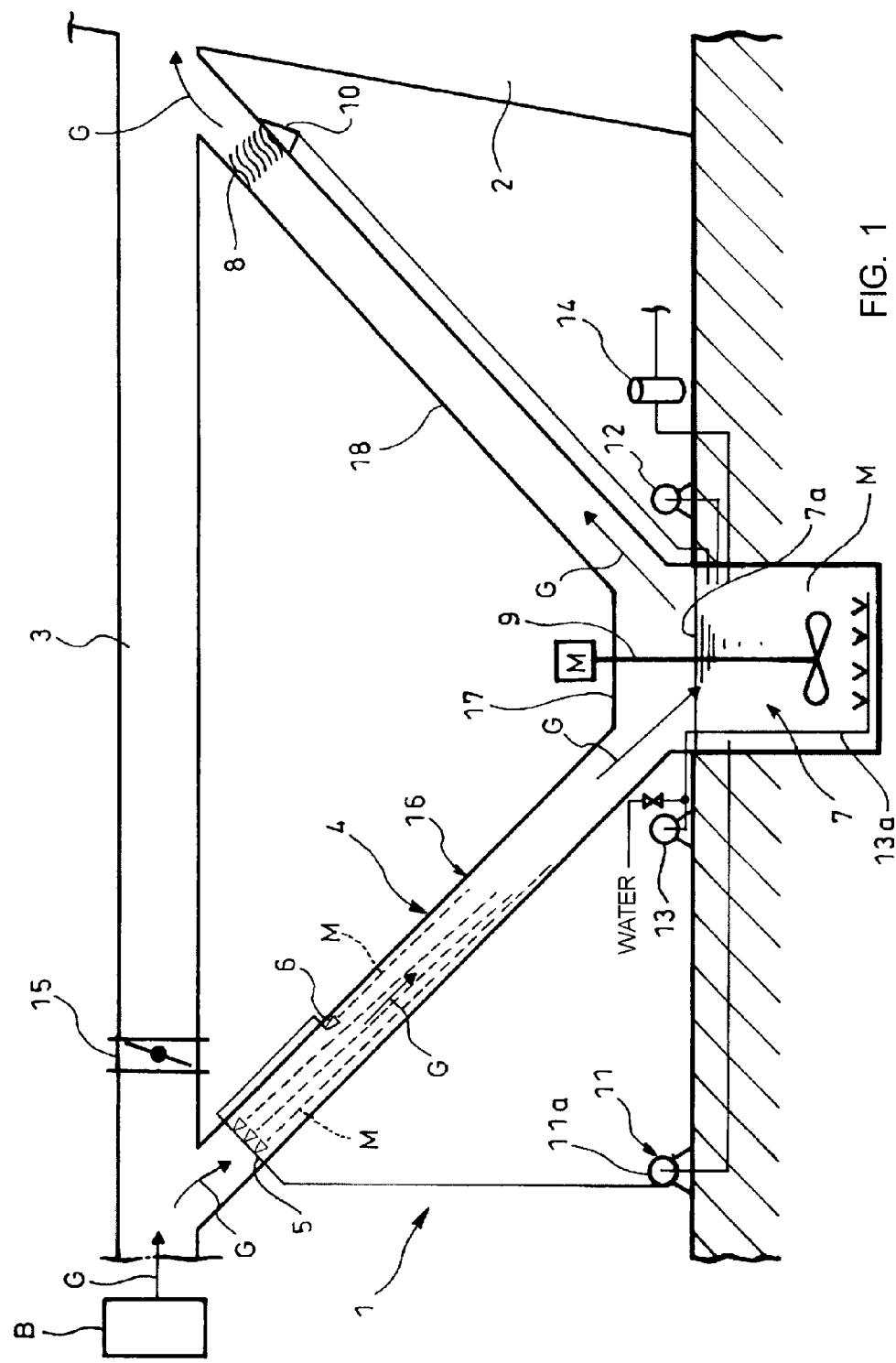
FIG. 1 is a sectional view showing a desulfurizer according to the disclosure.

Next, an embodiment of the disclosure will be described in conjunction with FIG. 1 which is a sectional view showing a desulfurizer 1 according to the disclosure.

The desulfurizer 1 is arranged below a flue path 3 which in turn guides flue gas G from a boiler B (fuel combustor) to a stack 2. The desulfurizer 1 comprises a V-shaped flow passage 4, a sprayer 5, an auxiliary sprayer 6, a reservoir 7, a mist eliminator 8, a stirrer 9, a mist circulator 10, an absorbing liquid circulator 11, an absorbing liquid feeder 12, an oxygen feeder 13 and a dehydrator 14. Arranged in the flue path 3 is a bypass damper 15.

The V-shaped flow passage 4 is a flow passage V-shaped in side view which extracts the flue gas G upstream in the flue path 3 and returns the same downstream in the flue path 3. The V-shaped flow passage 4 comprises a descending downward-inclined flow passage 16, a horizontal flow passage 17 connected to the downward-inclined flow passage 16 to horizontally guide the flue gas G and an ascending upward-inclined flow passage 18 connected to the horizontal flow passage 17 to guide the flue gas G to the flue path 3. The downward- and upward-inclined flow passages 16 and 18 are, for example, round in flow passage cross section.

Arranged in the flue path 3 and between a connection of the flue path 3 with the downward-inclined flow passage 16 and a connection of the upward-inclined flow passage 18 with the flue path 3 is a bypass damper 15 for control of the flue gas G. With the bypass damper 15 being closed, the flue gas G is allowed to flow into the downward-inclined flow passage 16.

The sprayer 5 is arranged upstream in the downward-inclined flow passage 16 and adjacent to the connection thereof with the flue path 3. The sprayer 5 has a plurality of nozzles along a diametrical direction of the flow passage (the direction perpendicular to an axis of the flow passage). The nozzles inject absorbing liquid M in a direction same as that of the flow of the flue gas G in the downward-inclined flow passage 16, i.e., in parallel with that of the flow of the flue gas G. The absorbing liquid M is, for example, in the form of minute droplets containing limestone (calcium carbonate) and misty.

The auxiliary sprayer 6 comprises, just like the sprayer 5, nozzles for injection of the absorbing liquid M. The auxiliary sprayer 6 is arranged in the downward-inclined flow passage 16 downstream of the sprayer 5 to inject the absorbing liquid M in the upper zone of the flow passage and at a point where the absorbing liquid M is not dense.

The reservoir 7, which stores the absorbing liquid M, is positioned at a bottom of the horizontal flow passage 17 and at a position where a liquid surface 7a is in conflict with the flow of the flue gas G flowing from the downward-inclined flow passage 16. Since the liquid surface of the reservoir 7 is in the position of confliction with the flow of the flue gas G, almost all of the absorbing liquid M injected from the sprayer 5 is guided to the reservoir 7. Resultant calcium sulfite and calcium carbonate from the desulfurization by the absorbing liquid M are also stored in the reservoir 7. Inside of the reservoir 7 is stirred by the stirrer 9 so as to prevent solid contents such as calcium sulfite and calcium carbonate from being accumulated on a bottom. The stirrer 9 is not essential and may be omitted depending on embodiments of the desulfurizer 1.

The mist eliminator 8 captures the absorbing liquid M unguided to the reservoir 7 and entrained in the flue gas G up to a downstream side in the upward-inclined flow passage 18. The captured absorbing liquid M is returned through a mist circulator 10 to the reservoir 7. The mist eliminator 8 is not essential and may be omitted if little absorbing liquid M is conveyed to the downstream side in the inclined flow passage.

The absorbing liquid circulator 11 comprises a pump 11a which pumps up the absorbing liquid M in the reservoir 7 to the sprayer 5. The absorbing liquid feeder 12 feeds new absorbing liquid M to the reservoir 7.

The oxygen feeder 13 feeds oxygen as an oxidation agent through a blowing pipe 13a into the reservoir 7 to supply the oxygen to compounds in the reservoir 7 requiring oxidizing process. In the blowing pipe 13a, a small amount of water is caused to flow for prevention of attachment of the slurry. The compound such as calcium sulfite requiring the oxidation process is oxidized in the reservoir 7 into calcium sulfate (gypsum). The dehydrator 14 extracts part of the absorbing liquid M at the bottom of the reservoir 7 to remove calcium sulfate. Drainage water made free from calcium sulfate is conveyed to waste water treatment equipment (not shown). As the oxidizing agent, air may be used.

Next, in conjunction with FIGS. 2(A) and 2(B), desulfurization of the sulfur oxides in the flue gas 16 in downward-inclined flow passage 16 will be described. FIG. 2(A) is a sectional view showing the sprayer 5 and the auxiliary sprayer 6 arranged in the downward-inclined flow passage 16. FIG. 2(B) is a sectional view showing a portion of the downward-inclined flow passage 16 at and downstream of the auxiliary sprayer 6.

As shown in FIG. 2(A), the sprayer 5 injects the absorbing liquid M in the direction same as, i.e., in parallel with that of the flue gas G. The absorbing liquid M entrained in the flue gas G proceeds in the downward-inclined flow passage 16. The downward-inclined flow passage 16 downwardly descends, as mentioned previously, and the absorbing liquid M does not proceed, due to gravitational force applied, axially in the downward-inclined flow passage 16 but flows downstream while dropping downward in the flow passage; thus, the absorbing liquid M has increased density at its vertically lower side and decreased density at its vertically upper side as it advances downward in the downward-inclined flow passage 16. The non-uniformity of the absorbing liquid M causes deterioration of the desulfurizing performance.

Thus, the disclosure further provides the auxiliary sprayer 6 downstream of the sprayer 5 to further inject the absorbing liquid M, as shown in FIG. 2(B), axially of the flow passage from vertically upper side in the downward-inclined flow passage 16 so as to make the absorbing liquid M uniform in the downward-inclined flow passage 16. Thus, the non-uniformity of the absorbing liquid M in the downward-inclined flow passage 16 is resolved to enhance the desulfurizing performance.

Figure 2:
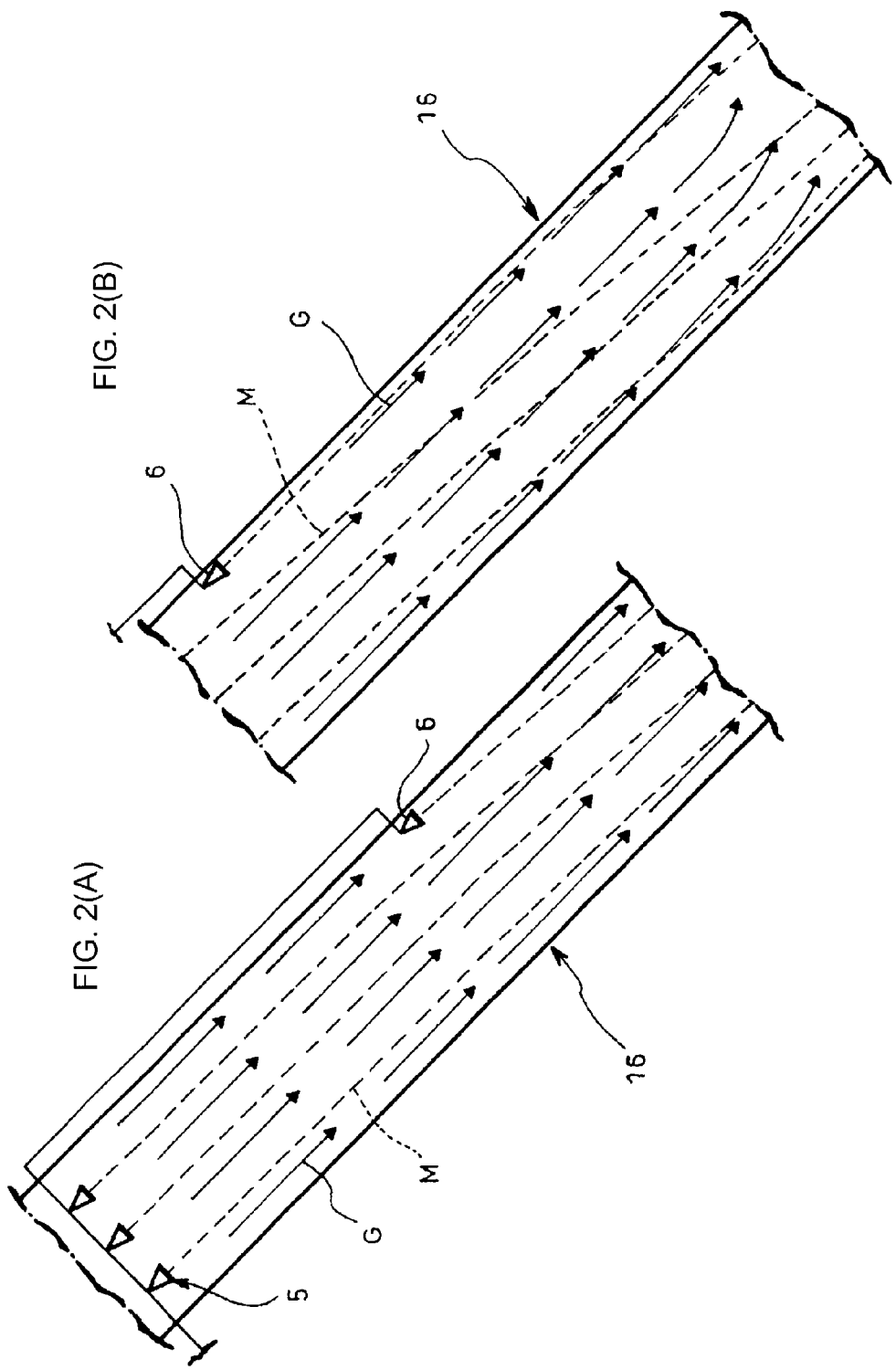
FIG. 2(A) is a sectional view showing a sprayer and an auxiliary sprayer arranged in a downward-inclined flow passage and FIG. 2(B) is a sectional view showing a part of the downward-inclined flow passage at and downstream of the auxiliary sprayer.
Figure 3:
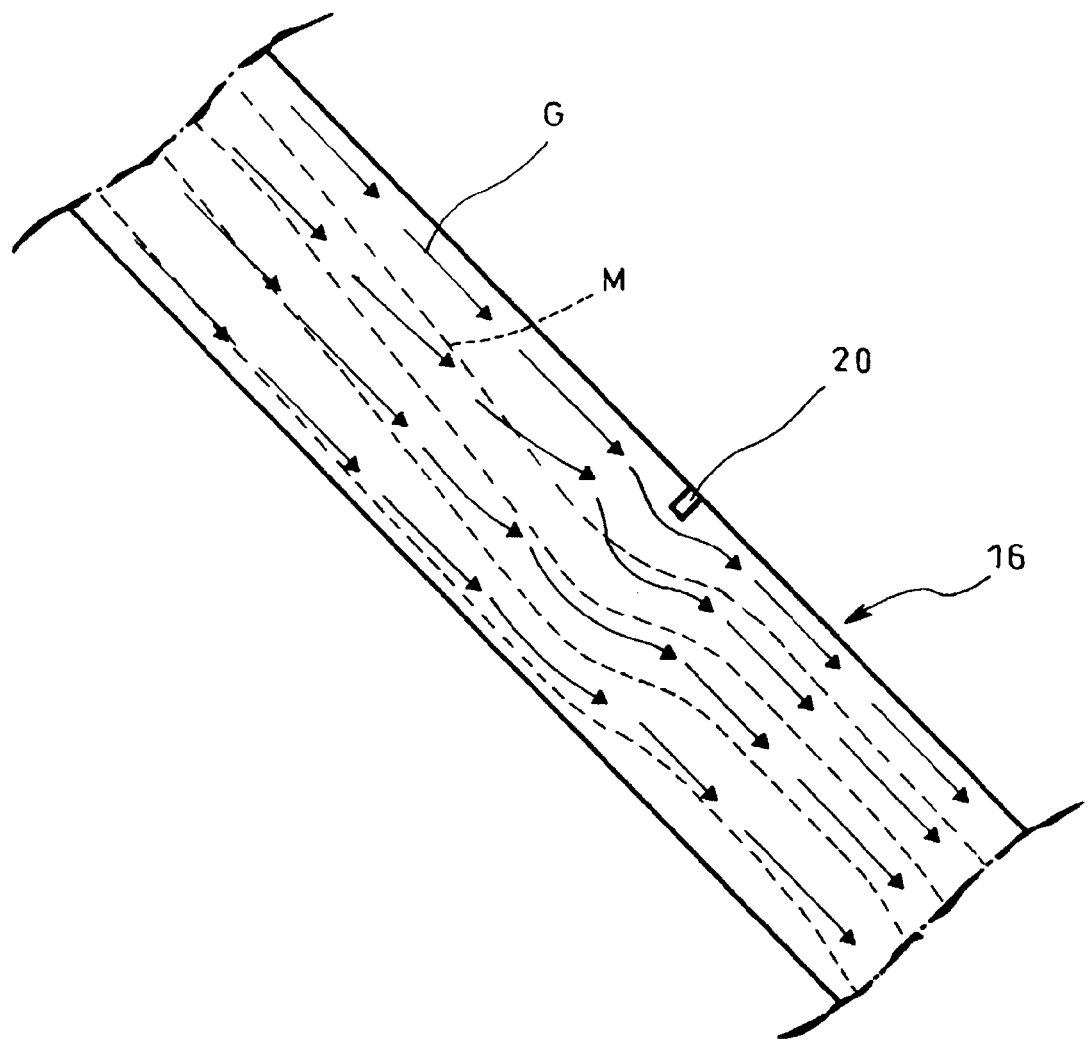
FIG. 3 is a sectional view showing a modification of the downward-inclined flow passage.

Next, a modification of the downward-inclined flow passage 16 according to the disclosure will be described in conjunction with FIG. 3. FIG. 3 is a sectional view showing the modification of the downward-inclined flow passage 16 in which parts identical with those in FIGS. 1 and 2 are represented by the same reference numerals. The modification, which has a fundamental structure similar to that in the downward-inclined flow passage 16 shown in FIGS. 1, 2(A), and 2(B) resides in that a baffle plate 20 is arranged in the downward-inclined flow passage 16 as shown in FIG. 3.

Resolved by the embodiment described in the above is the non-uniformity of the absorbing liquid M in the downward-inclined flow passage 16. However, if the downward-inclined flow passage 16 is axially long in length, despite of the fact that the non-uniformity of the absorbing liquid M is resolved, the uniformly distributed absorbing liquid M drops downward due to the gravitational force as it advances downward, whereby the absorbing liquid M has higher density in the vertically lower zone of the flow passage than that in the vertically upper zone of the flow passage. The non-uniformity of the absorbing liquid M causes lowering of desulfurizing performance.

Then, in this modification, arranged downstream of the auxiliary sprayer 6 and in the upper zone of the downward-inclined flow passage 16 is a baffle plate 20. The baffle plate 20 is a plate member projected from a vertically upper side (upper portion) of an inner wall of the downward-inclined flow passage 16.

As shown in FIG. 3, upstream of the baffle plate 20, the absorbing liquid M drops downward due to the influence of the gravitational force and therefore has density higher in the vertically lower zone of the flow passage than that in the vertically upper zone of the flow passage. As a result, the flue gas G flows easily in the vertically upper zone of the flow passage where the absorbing liquid has lower density and effect by the pressure is hardly susceptible. When the absorbing liquid M and the flue gas G flow up to the baffle plate 20, the baffle plate 20 throttles a diameter of the flow passage so that, against the absorbing liquid M and the flue gas G passing over the baffle plate 20, pressure generates diametrically inwardly of the flow passage (in a projected direction of the baffle plate 20); after passing over the baffle plate 20, the absorbing liquid M and the flue gas G are relieved from the pressure and uniformly diffuse diametrically outwardly of the flow passage (in a direction reverse to the projected direction of the baffle plate 20). Thus, even if the downward-inclined flow passage 16 is axially long in length and thus the absorbing liquid M uniformized by the auxiliary sprayer 6 becomes non-uniform, the baffle plate 20 can uniformize the absorbing liquid M and prevent lowering of desulfurizing performance due to the non-uniformity of the absorbing liquid M. Moreover, since the baffle plate 20 is arranged in the upper zone of the flow passage where the absorbing liquid M has lower density, there is no fear that the absorbing liquid M is stagnant at the baffle plate 20.

Figure 4:
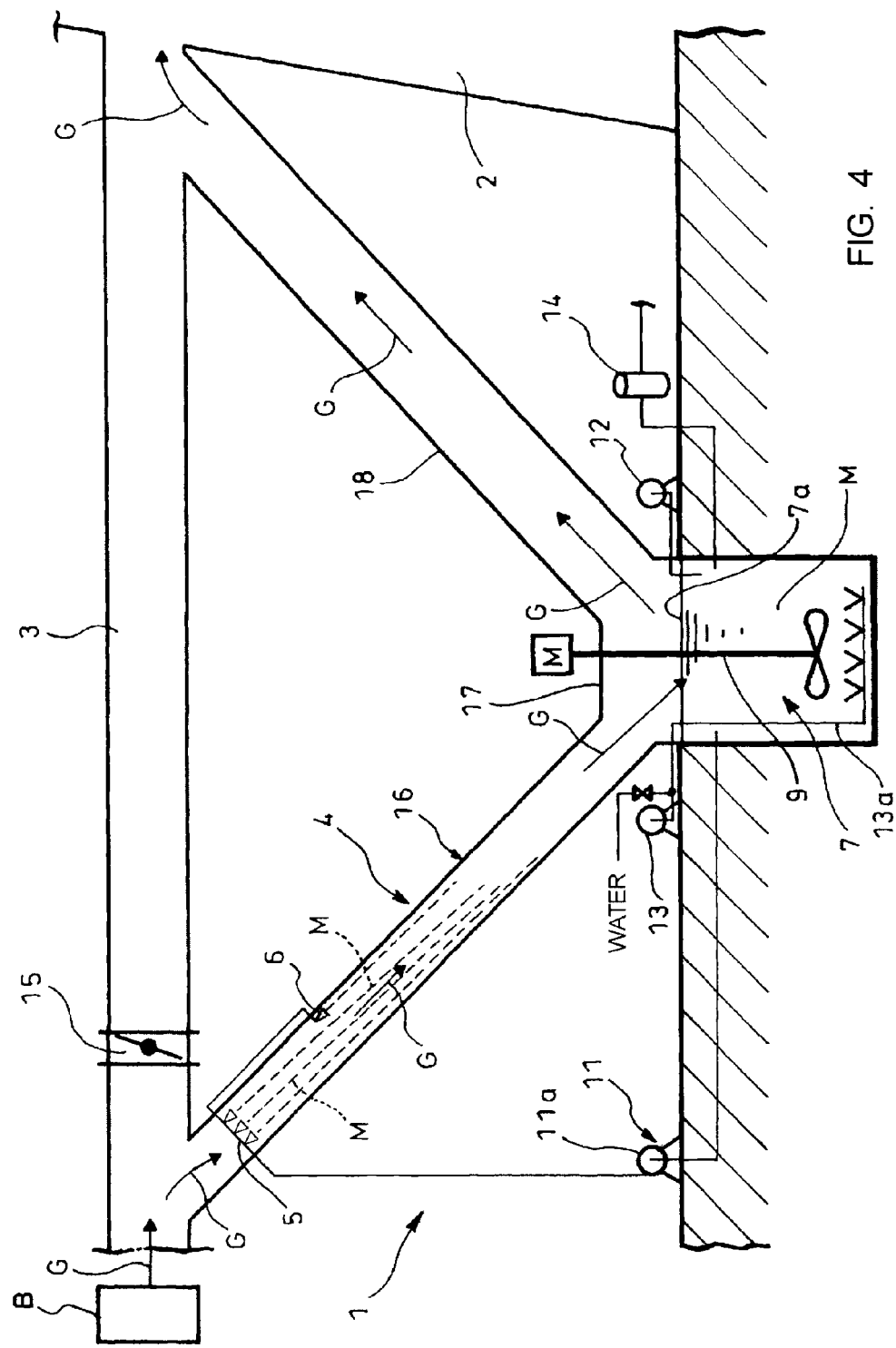
FIG. 4 is a sectional view showing a modification of the upward-inclined flow passage.

Next, a modification of the upward-inclined flow passage 18 according to the disclosure will be described in conjunction with FIG. 4. FIG. 4 is a sectional view showing the modification of the upward-inclined flow passage 18 in which parts identical with those in FIGS. 1 and 2 are represented by the same reference numerals. The modification, which has a fundamental structure similar to that of the downward-inclined flow passage 16 shown in FIGS. 1, 2(A), and 2(B) resides in that a flow passage cross-sectional area of the upward-inclined flow passage 18 is greater than that of the downward-inclined flow passage 16 as shown in FIG. 4.

The modification has the upward-inclined flow passage 18 which is greater in flow-passage cross-sectional area than the downward-inclined flow passage 16. Thus, the flue gas G flowing through the downward-inclined flow passage 16 is reduced in flow rate in the upward-inclined flow passage 18. Specifically, the absorbing liquid M not guided to the reservoir 7 is reduced in flow rate to an extent that it is not conveyed by the flue gas G on the downstream side in the upward-inclined flow passage 18. Thus, in the modification, the absorbing liquid M is not caused to flow up to the downstream side in the upward-inclined flow passage 18. The absorbing liquid M conveyed to the upward-inclined flow passage 18 naturally slides down, due to a weight itself, in the upward-inclined flow passage 18 into the reservoir 7. According to the modification, the mist eliminator 8 and the mist circulator 10 may be omitted, which can reduce fabrication cost for the desulfurizer 1.

The modification of the downward-inclined flow passage 16 and the modification of the upward-inclined flow passage 18 may be used both or singly with the disclosed embodiment. As a further modification, a sprayer 5 may be further provided downstream of the auxiliary sprayer 6. The auxiliary sprayer 6 may be positioned in any position in the flow passage, provided that it uniformizes the absorbing liquid M in the flow passage; it may be positioned upstream or downstream in the downward-inclined flow passage 16; it may be further arranged upstream in the horizontal flow passage 17.

It is to be understood that a desulfurizer according to the disclosure is not limited to the above embodiment and that various changes and modifications may be made without departing from the scope of the disclosure.

REFERENCE SIGNS LIST

1 desulfurizer
2 stack
3 flue path
5 sprayer
6 auxiliary sprayer
7 reservoir
8 mist eliminator
16 downward-inclined flow passage
18 upward-inclined flow passage
20 baffle plate
B boiler (fuel combustor)
G flue gas
M absorbing liquid

The invention claimed is:

1. A desulfurizer comprising
a descending downward-inclined flow passage through which flows flue gas from a flue path connecting a fuel combustor with a stack,
a sprayer arranged upstream in the downward-inclined flow passage to inject absorbing liquid absorptive of sulfur oxides in a direction same as that of flue gas flow,
an ascending upward-inclined flow passage to guide the flue gas from the downward-inclined flow passage to the flue path,
a reservoir arranged between lower ends of the upward- and downward-inclined flow passages,
an auxiliary sprayer arranged in the downward-inclined flow passage downstream of the sprayer to inject absorbing liquid axially of the downward-inclined flow passage from a vertically upper side in the downward-inclined flow passage, and
a baffle plate arranged in the downward-inclined flow passage downstream of the auxiliary sprayer and in an upper zone of the flow passage, said baffle plate being a plate member projected diametrically inwardly from the vertically upper side of the downward-inclined flow passage.

2. The desulfurizer as claimed in claim 1, wherein a mist eliminator to remove mist of the absorbing liquid is arranged downstream in the upward-inclined flow passage.

3. The desulfurizer as claimed in claim 1, wherein the upward-inclined flow passage has a flow-passage cross sectional area greater than that of the downward-inclined flow passage.

4. The desulfurizer as claimed in claim 2, wherein the upward-inclined flow passage has a flow-passage cross sectional area greater than that of the downward-inclined flow passage.

5. The desulfurizer as claimed in claim 1, wherein the flue path includes a bypass damper, and the flue gas flows from the fuel combustor to the stack through the descending downward-inclined flow passage and the ascending upward-inclined flow passage when the bypass damper is closed.

* * * * *